US011088840B2

(12) United States Patent
Nolte et al.

(10) Patent No.: US 11,088,840 B2

(45) Date of Patent: Aug. 10, 2021

(54) TRUSTED TERMINAL PLATFORM

(71) Applicant: WINCOR NIXDORF INTERNATIONAL GmbH, Paderborn (DE)

(72) Inventors: Michael Nolte, Brakel (DE); Valdemar Zavadsky, Prague (CZ)

(73) Assignee: WINCOR NIXDORF INTERNATIONAL GMBH, Paderborn (DE)

( * ) Notice: Subject to any disclaimer, the term of this patent is extended or adjusted under 35 U.S.C. 154(b) by 1570 days.

(21) Appl. No.: 14/773,419

(22) PCT Filed: Mar. 5, 2014

(86) PCT No.: PCT/EP2014/054223

§ 371 (c)(1),
(2) Date: Sep. 8, 2015

(87) PCT Pub. No.: WO2014/135569

PCT Pub. Date: Sep. 12, 2014

(65) Prior Publication Data

US 2016/0020906 A1 Jan. 21, 2016

(30) Foreign Application Priority Data

Mar. 5, 2013 (EP) .................................... 13157884

(51) Int. Cl.
*H04L 9/32* (2006.01)
*G06Q 20/20* (2012.01)
(Continued)

(52) U.S. Cl.
CPC ............ *H04L 9/3234* (2013.01); *G06F 21/83* (2013.01); *G06F 21/86* (2013.01); *G06Q 20/20* (2013.01);
(Continued)

(58) Field of Classification Search
None
See application file for complete search history.

(56) References Cited

U.S. PATENT DOCUMENTS 5,970,146 A 10/1999 McCall et al.
6,317,835 B1 * 11/2001 Bilger .................... G06F 21/83 380/52

(Continued)

FOREIGN PATENT DOCUMENTS

CN 101989172 A 3/2011
EP 1 286 242 2/2003

(Continued)

OTHER PUBLICATIONS

A Theft-Resistant Adjustable Security Box for Digital Cameras, Cypher et al., Oxford, UK: The Wildlife Society, The Journal of wildlife management, 2007, vol. 71 (6), p. 2077-2080.*

(Continued)

*Primary Examiner* — Neha Patel
*Assistant Examiner* — Isidora I Immanuel
(74) *Attorney, Agent, or Firm* — Black, McCuskey, Souers & Arbaugh LPA

(57) ABSTRACT

A point-of-sale (POS) terminal is provided for entering a PIN to enable a financial transaction. The point-of-sale terminal has a card reader for reading information from a credit card, a processor for running an operating system, with applications, a touch screen for displaying information and receiving user inputs, and a Security-Box connected between the touch screen and the processor to control the user input on the touch screen to the processor. The Security Box is configured to run in a "PIN Entry Mode" and a "Clear Text Mode." When running in "PIN Entry Mode" the user input is not forwarded as touch coordinates to the processor
(Continued)

Touch Sensor
Touch Controller
CC Reader
Removal Sensor
Security Box
Tamper Pad
Antenna
USB
HF
NFC Controller
eDisassembly switch
UART
USB
MS Reader
USB
Processor
Main PCB
Terminal and when running in "Clear Text Mode" the touch coordinates are transmitted to the processors.

13 Claims, 8 Drawing Sheets

(51) Int. Cl.

| | |
|---|---|
| ***G06Q 20/38*** | (2012.01) |
| ***G06F 21/83*** | (2013.01) |
| ***G07F 7/10*** | (2006.01) |
| ***G06F 21/86*** | (2013.01) |
| ***G06Q 20/40*** | (2012.01) |
| ***H04L 29/06*** | (2006.01) |

(52) U.S. Cl.

CPC ..... *G06Q 20/3829* (2013.01); *G06Q 20/4012* (2013.01); *G07F 7/1016* (2013.01); *G07F 7/1041* (2013.01); *G07F 7/1091* (2013.01); *H04L 63/083* (2013.01)

(56) References Cited

U.S. PATENT DOCUMENTS

| | | | | |
|---|---|---|---|---|
| 6,715,078 | B1 | 3/2004 | Chasko et al. | |
| 2006/0117177 | A1* | 6/2006 | Buer | G06F 21/72 713/155 |
| 2006/0224523 | A1 | 10/2006 | Elvitigala | |
| 2009/0049307 | A1* | 2/2009 | Lin | G06F 21/85 713/185 |
| 2011/0321173 | A1* | 12/2011 | Weston | G06Q 20/4012 726/27 |
| 2012/0132705 | A1 | 5/2012 | Goluke et al. | |
| 2012/0169774 | A1* | 7/2012 | Yu | G06F 3/04883 345/661 |
| 2014/0092143 | A1* | 4/2014 | VanBlon | G09G 5/363 345/684 |

FOREIGN PATENT DOCUMENTS

| | | | |
|---|---|---|---|
| EP | 1286242 | A1 | 2/2003 |
| EP | 1 460 593 | | 9/2004 |
| EP | 1460593 | A1 | 9/2004 |
| EP | 2 280 363 | | 2/2011 |
| EP | 2 280 363 | A1 | 2/2011 |
| EP | 2280363 | A1 | 2/2011 |
| EP | 3575938 | * | 11/2013 |
| JP | S61228569 | | 10/1986 |
| JP | S63059690 | | 3/1988 |
| JP | H111168524 | A | 6/1999 |
| JP | 2002269579 | A | 9/2002 |
| JP | 2007526573 | A | 9/2007 |
| JP | 2008065365 | A | 3/2008 |
| JP | 2013011997 | A | 1/2013 |
| JP | 2009-282770 | A | 12/2013 |
| WO | 2011/051757 | | 5/2011 |
| WO | 2011051757 | A1 | 5/2011 |

OTHER PUBLICATIONS

Second Office Action issued in the corresponding Chinese application; 10 pages.
Office Action issued in the corresponding European Application; 5 pages.
Office Action for Corresponding Mexican Application No. MX/a/2015/011461, dated Sep. 7, 2017.
Office Action for Corresponding Japanese Application No. 2015-560671, dated Oct. 13, 2017.
Translation for Japanese Office Action.
Machine Translation for JP2009282770A.
Mexican Office Action dated Apr. 17, 2017.
Eurasian Office Action dated Jan. 31, 2017.
International Search Report.
Office Action issued in corresponding Mexican Application No. MX/a/2015/011461. 4 pages.
Office Action, dated Nov. 21, 2017, for corresponding Eurasian Patent Application No. 201591604/31.
Office action issued in the corresponding Eurasian partial application; 3 pages.
Office action issued in the corresponding European partial application; 8 pages.
EP1460593A1 Machine Translation dated Dec. 18, 2017.
Office Action, dated Oct. 16, 2017, for corresponding Singapore Patent Application No. 10201605863T.
Office action issued in the corresponding Japanese partial application; 7 pages.
Office action issued in the corresponding Chinese application; 5 pages.
Examination report issued in the corresponding New Zealand application; 4 pages.
Office action issued in corresponding Mexican application; 9 pages.
Office Action issued in the corresponding Australian application; 4 pages.
Australian Patent Office; "Examination report No. 1 for standard patent application;" Australian Patent Application No. 2019279985; dated Dec. 4 2020.
Japanese Patent Office; "Notification of Reason for Rejection;" Japanese Patent Application No. 2015-560671; dated Feb. 14, 2020.
Office Action, dated Dec. 30, 2019, for corresponding Eurasian Patent Application No. 201591604/31.

* cited by examiner

TRUSTED TERMINAL PLATFORM

BACKGROUND

1. Field of the Invention

The invention relates to User-terminal for entering secure user information. In a possible embodiment the invention refers to Point-of-sale (POS) terminal for entering a PIN to enable a financial transaction.

2. Description of the Related Art

User-terminal for entering secure user information can be used in different environments. The terminals can be used for online shopping, for self service automation. For point of sale application. A point-of-sale (POS) terminal is a computerized replacement for a cash register. The POS system can include the ability to record and track customer orders, process credit and debit cards, connect to other systems in a network, and manage inventory. Generally, a POS terminal has as its core a personal computer, which is provided with application-specific programs and I/O devices for the particular environment in which it will serve. A POS system for a restaurant, for example, is likely to have all menu items stored in a database that can be queried for information in a number of ways. POS terminals are used in most industries that have a point of sale such as a service desk, including restaurants, lodging, entertainment, and museums.

For normal transactions the credit card information are read by a card reader and the customer has to type his pin to authorize the transaction. The functionality of the standard terminals for POS is very limited to the keypad and a small display showing the amount of money to be charged from the credit card.

EP 2280 363 and US 2012 0132705 A1 discloses a touch module in an ATM.

SUMMARY

A user-terminal in accordance with the invention is configured to run at least first and second types of applications displaying information on the touch screen and allowing an interaction with the user. The first of the applications is interacting with the Security-Box to perform security relevant financial transactions. The second application, Add-on applications, interacts in “Clear Text Mode” with the touch screen, wherein the application interacting with the Security-Box and switching the Security-Box into “Secure Mode” needs to be to authenticated with the Security Box using a cryptographic method with one or more security keys. The security keys are stored in the Security-Box and/or in a secure area on a main board comprising the processor and/or in an unsecure area of the main board comprising the processor. The Add-on applications are interacting directly with the touch-screen via the Security-Box, wherein the Security-Box is in a pass-through mode which allows a direct interaction with the touch-screen. In a possible embodiment the security keys are stored in the Security-Box and/or in a secure area on a main board comprising the processor and/or in an unsecure area of the main board comprising the processor.

This approach can be supported by the corresponding operating system drivers which are logically located between the Security-Box and the applications accessing the Security-Box. Whenever an application access the Security-Box the drivers requests or loads the corresponding signature or cryptogram from the application and provides this to the Security-Box. In an alternative approach an API provided for accessing the Security-Box always requests as parameter the corresponding signature or cryptogram from the application. The signature can be a hash of the program code of the application with is signed by a cryptographic key. The hash of the application for example can be verified by the driver or the Security-Box itself. If the driver is supporting the Security Box also the driver needs to be verified, which can be done for example when starting the operating system. Also the Security-Box can have a list of applications which are allowed to access the Security-Box and stores the corresponding hash value. When accessing the Security-Box the security box recalculates the hash value of the application to verify if the application is admitted to access the Security-Box Also the use of a cryptogram where information is encrypted by public key of the Security-Box can be used.

In a possible embodiment the Security-Box is configured to verify the signature or cryptogram of the application interacting with the Security-Box before allowing switching into “Secure Mode”. Only if the application is authenticated before the Security-Box the Security-Box changes into “Secure Mode”.

In one embodiment the user terminal is a mobile device, like a mobile pad, without any physical keyboard, allowing interaction via the touch screen. The size can be from 5-15 inches allowing transaction to be performed mobile. For example the payment in restaurant can be performed by the mobile device which has also a card reader, to perform a financial transaction.

The user terminal may be configured to run a standard operating system, preferably Android, allowing to run Add-On-Applications and applications interacting with the Security-Box. This approach allows also to use the terminal as a standard pad device and a user can download Add-On-Applications from an application store. These applications can in run in parallel on the device but are not able to access the Security-Box.

In a possible embodiment the touch screen is connected to the Security-Box via a USB-channel and the Security-Box is connected to the processor also via a USB-Channel. In an alternative embodiment the touch sensor is connected via SPI (Serial Peripheral Interface) to the Security-Box (SB). The display is connected via an LVDS/DSI Bridge (Low Voltage Differential Signaling/Display Serial interface) to the main processor. The SB is physically connected via USB to the main processor via this interface, the touch coordinates and the crypto commands are transmitted. From the perspective of an application two logical USB connections are implemented as a USB Composite Device.

In a possible embodiment the secure user information is a PIN or a password to have access to personal account information and/or physical items. In this configuration the “Secure Mode” is a “PIN Entry Mode”.

In a possible embodiment the user terminal is a POS (Point of Sales) Terminal. The POS Terminal is a terminal for cashless payment transactions in a shop. The concept is related to the PCI PIN Transaction Security (PTS) Point of Interaction (POI) Modular Security Requirements [1]. The Terminal is a POS Terminal Device with rich functionality. Among other technologies, the Terminal integrates a Virtual Touch PIN Pad, Chip Card Reader, NFC-reader and/or WIFI and 3G. From the hardware point of view, the terminal consist of two main building blocks the main controller board (Main PCB) and a Security Box (SB).

The invention also comprises a Point-of-sale (POS) terminal for entering a PIN to enable a financial transaction, comprising:

a card reader for reading information from a credit card;

a processor for running an operating system, with applications;

a touch screen for displaying information and receiving user inputs;

a Security-Box being connected between the touch screen and the processor, to control the user input on the touch screen to the processor, wherein the Security Box is being configured to run in two modes "PIN Entry Mode" and "Clear Text Mode", wherein when running in "PIN Entry Mode" the user input is not forwarded as touch coordinates to the processor and when running in "Clear Text Mode" the touch coordinates are transmitted to the processors.

The Security Box will provide one or more of the following functions:

Secure Touch Controller
Secure Chip Card Reader
Secure Microcontroller
Secure storage of cryptographic keys
Random Number Generator
Internal tamper detection according to PCI
External tamper detection according to PCI The Main Controller will provide one or more of the following functions Interaction with the Magnetic Stripe Reader
Interaction with the NFC Card Reader
Switching the Light Control Filter
Controls the display using a standard display controller
Hosts an Android OS (other operating systems)
Hosts Payment Application
Hosts Value Add Applications
Hosts EMV Kernel In one possible embodiment the card reader is a chip card reader that is integrated into the Security Box, wherein the Security Box is configured to perform all necessary steps to process a financial transaction based on the PIN and the information of the chip card.

In a possible embodiment a virtual pin-pad is displayed on the touch screen the Security-Box switches to "PIN-Entry-Mode" and is configured to interpret the user touch as PIN, and to encrypt the PIN to forward the information together with credit card information to an associate service center/bank over a network controller. The Security-Box can forward the information also to payment application, which is responsible for an additional forwarding.

The payment application can run on the operating system switching the Security Box into "Pin Entry Mode" and displaying the virtual PIN-pad, and/or wherein the payment application forwards the card information from the card reader to the Security Box, wherein the payment application can also be responsible to forward the encrypted PIN from the Security Box to the service center/bank.

In a possible embodiment the PIN Pad is shifted randomly on the touch screen for every transaction and/or wherein the Security Box is informed about the coordinates of the PIN Pad, to be able to interpret the touch input. The coordinates of the PIN Pad can be provided by the payment application.

In a possible embodiment the unit is configured to submit in "Secure Mode" only replacement information, via a USB COM channel, to the operating system in case of a touch events.

In a possible embodiment is the Security Box connected to an optical indictor indicating when being in "Pin Entry mode". Only the Security Box is able to turn the indicator on, to show the user that the terminal is in a safe mode, which allows the user to enter his PIN.

In a possible embodiment the Security Box and the display are connected with each other, and sensors indicate when a disconnection is performed, which leads to a deletion of the keys in the Security Box. The approach should prevent that a third party can modify or listen to the connection of the touch screen and the Security Box. Additionally the Security box is physically attached to the display and protected by a cover.

Furthermore in possible embodiment the Payment Application which starts the Secure PIN Mode needs to authenticate with the Security Box using a cryptographic key which is generated by the Security Box and transferred to the payment application during registration. Wherein authentication is performed when a HID device driver and a generic USB device driver register to the Security Box, wherein the Security Box is connected to the processor via USB.

Additionally the Security Box can check the status of the operation system before booting. When booting, in a first step a program is booted that has access to information which are stored in the Security Box, to verify the operating system, and the operating system is started if the status of the operating system passes the verification.

Another aspect of the invention is a user-terminal for entering secure user information, comprising:

a processor for running an operating system, with applications;

a touch screen for displaying information and receiving user inputs and also to receive the secure information from the user;

a Security-Box being connected between the touch screen and the processor, to control the user input on the touch screen to the processor, wherein the Security-Box and the processor are connected via a serial interface configured to provide a first and a second logical connection, wherein the Security-Box is being configured to run in two modes "Secure Mode" using the first logical connection and "Clear Text Mode" using the second logical connection, wherein when running in "Secure Mode" the user input is not forwarded as touch coordinates to the processor via the second logical connection and when running in "Clear Text Mode" the touch coordinates are transmitted to the processor via the second logical connection.

In a possible embodiment the touch screen is connected to the Security-Box via a serial peripheral interface and the serial interface is a USB-Channel.

In a possible embodiment in the "Secure Mode" crypto commands are transmitted over the first logical connection.

In a possible embodiment the USB-Channel is configured as USB Composite Device Class implementing the first logical connection as a COM USB interface and the second logical connection as a HID interface.

In a possible embodiment the secure user information is PIN or a Password to have access to personal account information and/or physical items, and wherein the "Secure Mode" is a "PIN Entry Mode".

In a possible embodiment the User-Terminal is a Point-of-sale (POS) terminal for entering a PIN to enable a financial transaction, additionally comprising:

a card reader for reading information from a credit card.

In a possible embodiment the card reader is a chip card reader that is integrated into the Security-Box, wherein the Security-Box is configured to perform all necessary steps to process a financial transaction based on the PIN and the information of the chip card.

In a possible embodiment a virtual pin-pad is displayed on the touch screen the Security-Box switches to "PIN-Entry-Mode" and is configured to interpret the user touch as PIN, and to encrypt the PIN to forward the information together with credit card information to an associate service center/bank over a network controller.

In a possible embodiment the payment application is running on the operating system switching the Security-Box into "Secure Mode" and displaying the virtual PIN-pad, and/or wherein the payment application forwards the card information from the card reader to the Security-Box, wherein the payment application can also be responsible to forward the encrypted PIN from the Security-Box to the service center/bank.

In a possible embodiment the user terminal is configured to shift the PIN Pad randomly on the touch screen for every transaction and/or wherein the Security-Box is informed about the coordinates of the PIN Pad, to be able to interpret the touch input.

In a possible embodiment the user terminal is configured to submit in "Secure Mode" only replacement information, via the first logical channel, to the operating system in case of touch events.

In a possible embodiment the Security-Box is connected to an optical indictor indicating when being in "Security mode".

In a possible embodiment the Security-Box and the display are connected with each other, and sensors indicate when a disconnection is performed, which leads to a deletion of keys in the Security-Box.

In a possible embodiment the Security-Box is physically attached to the display and protected by a cover.

In a possible embodiment the Payment Application which starts the Secure PIN Mode needs to authenticate with the Security-Box using a cryptographic key which is generated by the Security-Box and transferred to the payment application during registration.

In a possible embodiment the Security-Box checks the status of the operation system before booting.

In a possible embodiment when booting, in a first step a program is booted that has access to information which are stored in the Security-Box, to verify the operating system, and the operating system is started if the status of the operating system passes the verification.

In a possible embodiment after a power on of the User-Terminal the Security-Box is configured to start in the "Secure Mode" and after a secure boot with successful verification of the operating system the Security-Box is configured to transfer to the "Clear Text Mode".

In a possible embodiment the user terminal is configured to run at least two types of applications displaying information on the touch screen and allowing an interaction with the user, the first of the applications is interacting with the Security-Box to perform security relevant financial transactions; and the other application, Add-on applications, interacting in "Clear Text Mode" with the touch-screen, wherein the application interacting with the Security-Box and switching the Security-Box into "Secure Mode" needs to be authenticated with the Security-Box using one or more security keys.

In a possible embodiment the application interacting with the Security-Box using a signature or cryptogram to authenticated with the Security-Box.

In a possible embodiment the Security-Box is configured to verify the signature or cryptogram of the application interacting with the Security-Box before allowing switching into "Secure Mode".

BRIEF DESCRIPTION OF DRAWINGS

The figures show a possible embodiments of the invention, which are referenced by the following description. Both do not intend to limit the scope of the invention.

DETAILED DESCRIPTION

Although the invention is described with respect to a special embodiment the invention is not restricted to this embodiment. The invention is directed to a universal user terminal with a touch screen on which security relevant and non security relevant applications are running.

Figure 1:
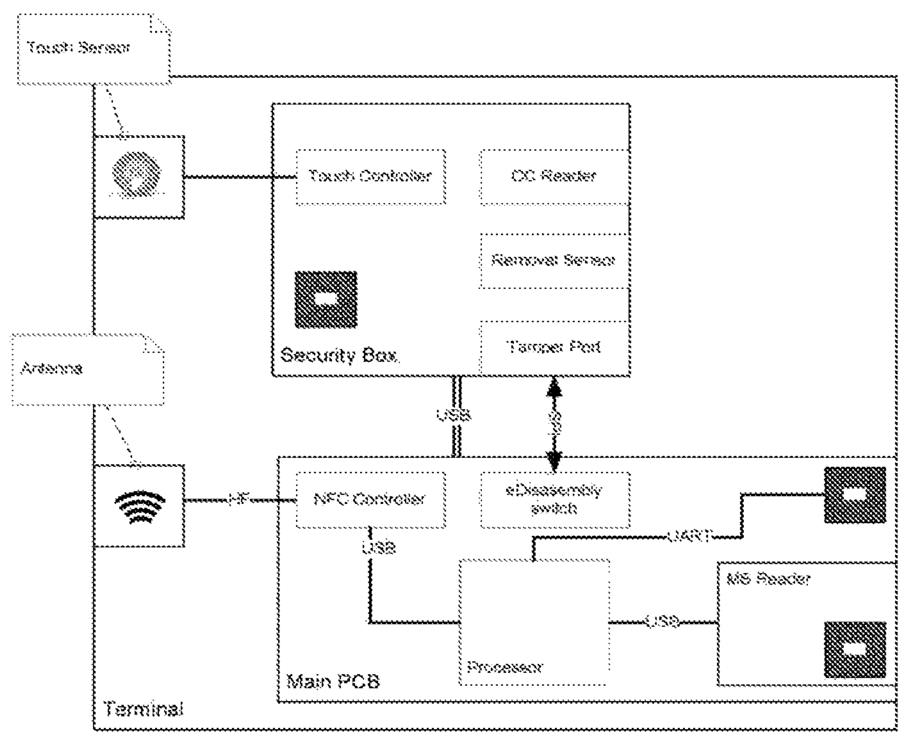
FIG. 1 shows the secure components of the invention.

FIG. 1 shows the secure components of the invention. PIN entry function is provided by the touch screen of the terminal. In a preferred embodiment no audible tones are generated by the nature of this solution. Despite this the terminal implements an audio jack which allows people with disabilities to control the entry function. Audible tones are generated by the audio unit of the main controller board. For PIN entry this is always the same frequency and the same volume when any key of the virtual PIN Pad is hit.

Additionally the context of the screen is switched off when the headphone is connected.

Figure 8:
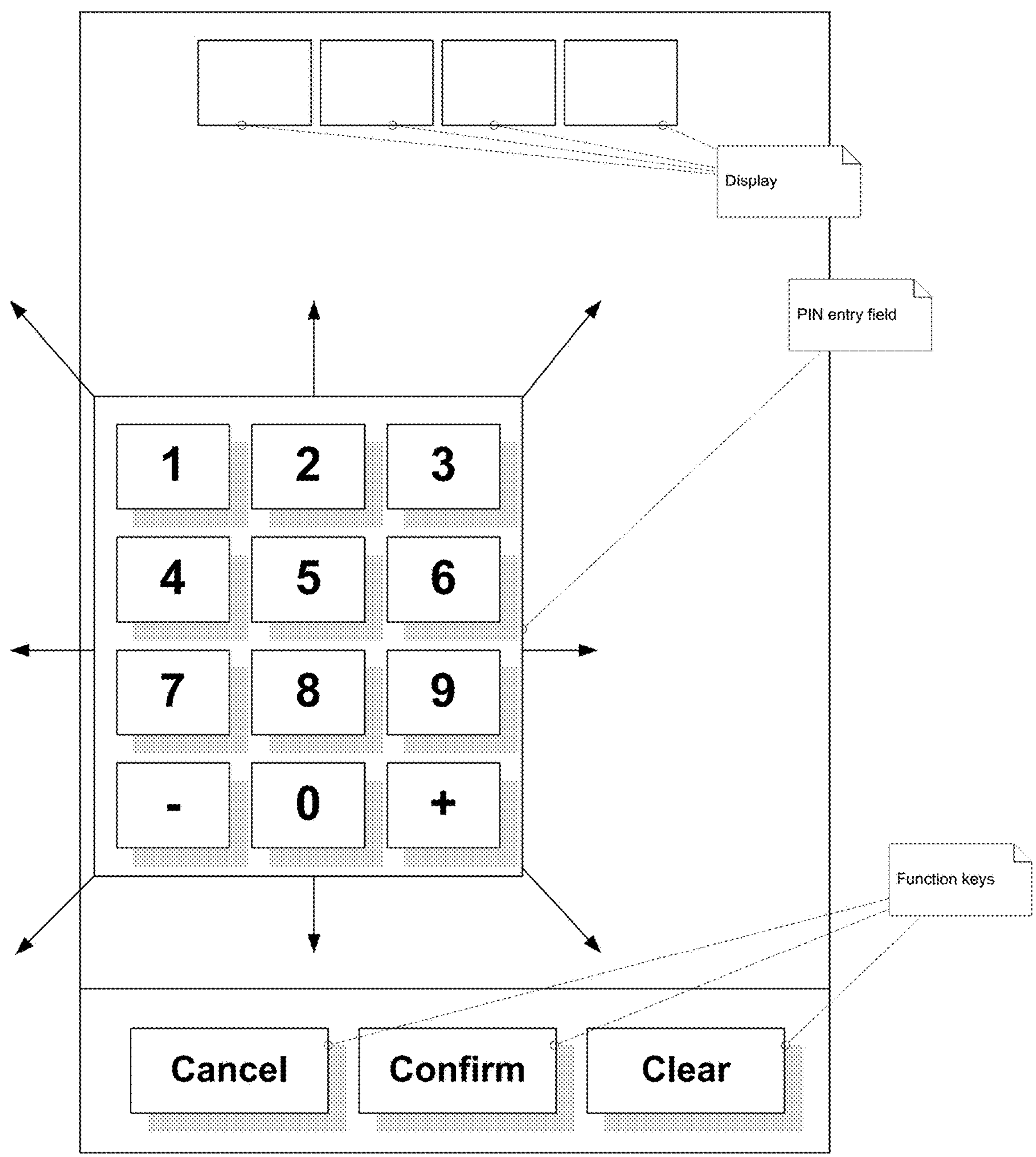
FIG. 8 shows the virtual PIN Entry with moving entry fields.

The Terminal provides a switchable light control filter which limits observation in a fixed solid angle when a PIN is entered via the virtual PIN Pad. Additionally the entire virtual PIN Pad is shifted randomly (FIG. 8) for every transaction. As additional secure measure the size of the key pad is changed per PIN entry.

The Terminal can use the MAGTEC MagneSafe Intelli-Head Reader [3]. The magnetic-stripe reader is in a possible embodiment connected to the main controller using a standard communication interface (USB (Universal Serial Bus) 1.1, HID). The reader itself is equipped with build-in security, encryption head and cryptographic functions for device authentication and key management. The encrypted track data is read by the payment app running on the main controller board and transferred to the security box for translation. The design of the Terminal prevents modifications like adding an additional head and microcontroller from inside and outside.

Each encrypting head contains a unique key which is shared with the Security Box and derived from a master key and the key serial number.

Key injection is operated in a Key Loading and Initialization Facility (KLIF) using a Key Loading Device which is provided by the manufacture.

The interaction of the reader is controlled by the payment application running on the main controller. In addition to the Security Box (FIG. 2), the device itself performs a self-test (FIG. 5, 6, 7) which includes integrity and authenticity checks upon boot and at least once a day.

Figure 3:
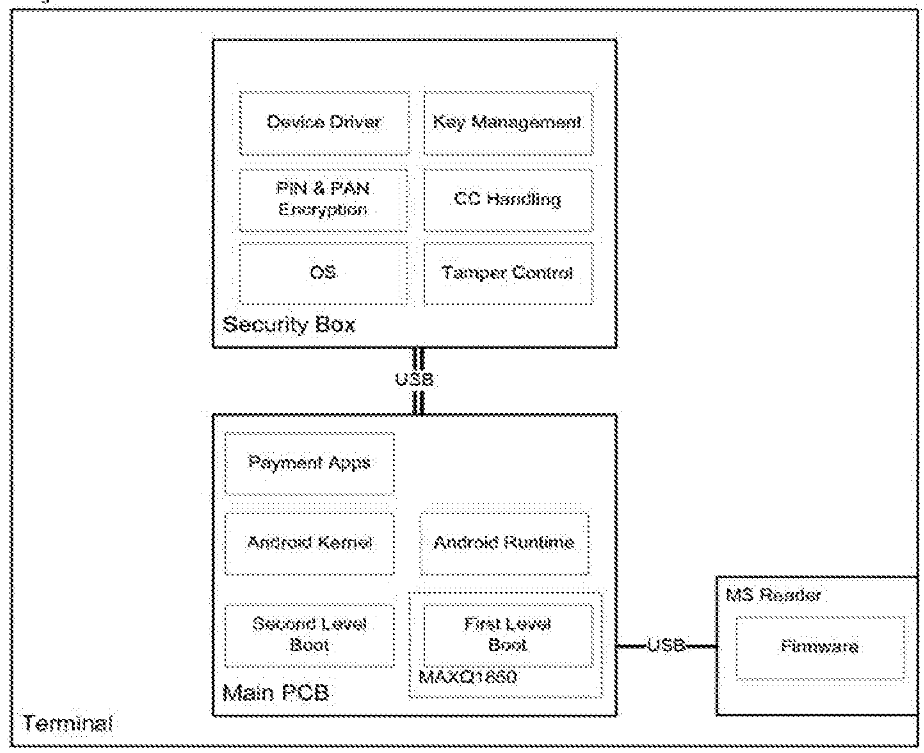
FIG. 3 shows the relevant software components.
Figure 4:
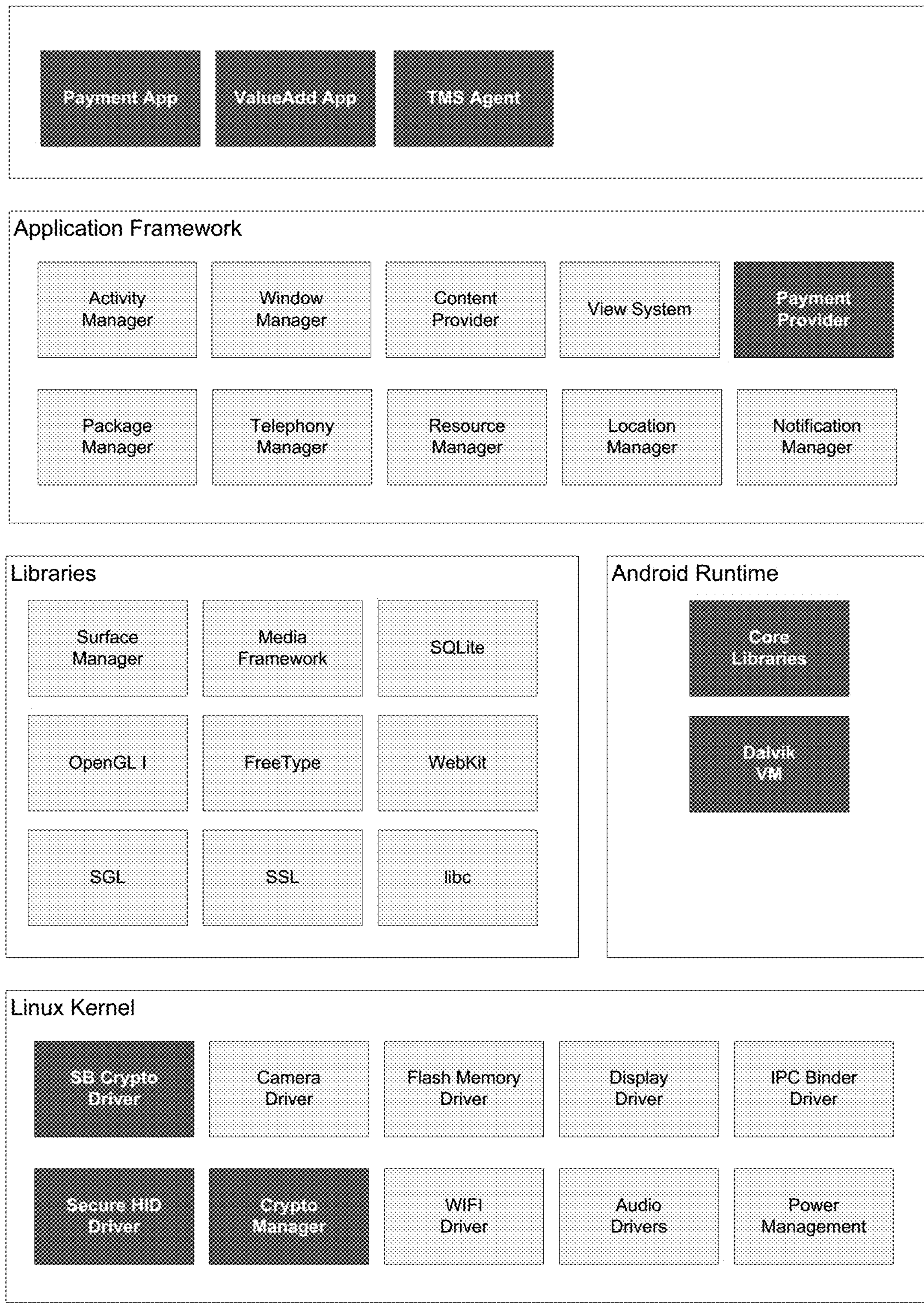
FIG. 4 shows the software stack of the operating system.

All Application modules (FIGS. 3 and 4) are under control of the Acquirer and signed by cryptographic procedure. The Terminal verifies the signature before execution.

The PCI Terminal Firmware is provided by the Terminal Vendor, any changes are reviewed in a QA process and documented.

Figure 7:
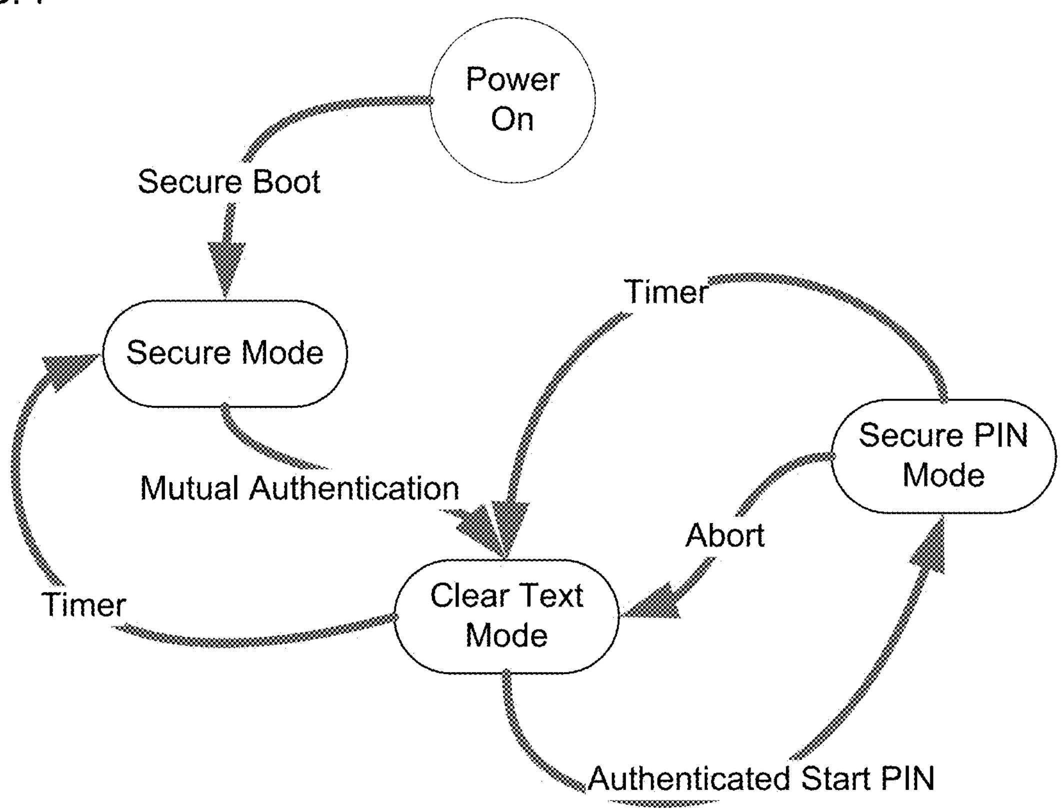
FIG. 7 shows the mode transitions of the invention.

The firmware image is signed by the Terminal Vendor as part of the Firmware Lifecycle process and verified by the Terminal before installation and execution (FIG. 7).

As part of the security system, the Security Box controls the PIN entry and the touch events. If the Security Box is in “PIN Entry Mode”, only replacement characters will be submitted via the USB COM channel, touch events are suppressed.

The Android OS and Kernel Modules (FIG. 4) are basis for a possible implementation. The System Package will contain only such modules which are necessary for operation. All Software executed on the Terminal run with least privilege; the System Package will be hardened accordingly.

The modification of the Touch Screen, e.g. connecting a non secure touch via USB will lead the Terminal into an inoperable state. The replacement of the touch driver will lead the Terminal into an inoperable state. During PIN entry no X/Y coordinates are submitted from the Security Box except replacement codes for the touched field (virtual key), hence the observation of touch events by analyzing the USB communication in PIN entry mode is not relevant. If the Security Box is in Clear Text Mode and submits X/Y coordinates to an authenticated application, the coordinates are preferably encrypted using a TDES key (128 bit). On the main controller the key is secured by the NV SRAM of the Security Controller.

The data link between these components is secured by design and/or cryptographic protocols. Key management is performed in compliance to ISO 11568 or ANSI X9.24. The Payment Card is always under control of the card holder.

If the Terminal device is connected via a ECR-Interface all text messages will be signed by the ECR and verified by the Terminal Software (Driver).

The Terminal provides the required cryptographic functionality SC embedded NV SRAM as keystore.

The Firmware is protected by cryptographic mechanisms. PCI Terminal Firmware is managed by a Software Lifecycle Management System. The System Package in rest is protected by Software called MKS Integrity Manager which precludes unauthorized modification.

The PCI Terminal Firmware itself is protected by cryptographic mechanism. The Terminal is equipped with a unique Device Number and a unique key pair. The information is loaded during manufacture in a controlled environment using principles of dual control and split knowledge.

PCI Terminal Firmware is executed under control of the Main Controller (preferably a OMAP4460); it needs to be cryptographically verified by the SB (FIG. 5,6,7) and is part of the PCI approval. PCI SB Firmware is executed under control of the SB microcontroller. The responsibility in terms of PCI approval is in hand of the Security Box vendor.

Add-On Applications (FIG. 4) are provided mainly by the Acquirer and these Apps are not part of the PCI approval.

The SB is connected via a USB (FIG. 1, FIG. 3) connection which implements a USB Composite Device Class as HID and COM Device Class. On top of the Android OS, the terminal hosts multiple applications (FIG. 4) which have access to the terminal WXGA screen and access to touch events generated by the PCI SB Firmware. These applications are Payment Applications Other Applications All applications have to be under strict control of the Acquirer or the Terminal Vendor. It should not possible to download unsigned software in order to process applications which are out of control of these two entities. System hardening and least privilege confinement of applications deliver sufficient control in order to protect those applications. If an application gains access to a WEB site and downloads content which will be processed on the terminal, the WEB Server and the content is under control of the Acquirer (PCI DSS requirements will be fulfilled).

The Terminal including its Security Box shall be evaluated according the PCI PTS 3.1. Modular Security Requirements following a modular evaluation approach.

The following describes the physical security segregation and boundary of the Terminal; the dark gray SE elements (FIG. 1) are “Secure Elements” which communicate cryptographically to each other.

The Security Box (SB) controls the PIN entry, cryptographic keys, EMV (Europay, MasterCard and Visa) PIN-offline verification and protects magnetic stripe data. It is connected via USB interface with the main controller and implements a USB Composite Device. In default mode the SB doesn’t send any touch events to the Main PCB, see Security Mode Transition. The SB includes measures in order to protect the removal of the device from the terminal. It additionally controls some external tamper sensors which are used for disassembly protection and mesh sensing. A tamper alarm will raise an immediate erasure of the SB internal Master Key.

The Main PCB (MPCB) controls the NFC, forwards Account Data to the SB and operates the software which controls the Payment and the Network. The MPCB embeds a Security Controller which is responsible for Secure Boot and provides a secure key store and cryptographic functions. The Terminal embeds disassembly switches which protect against disassembly. For example One switch is embedded with the SB and protects the Chip Card Reader; two switches are embedded on the MPCB. The switches are independent from each other and controlled by tamper ports of the SB.

The Main PCB microprocessor is preferably an OMAP4460™ high-performance microprocessor based on the enhanced Cortex™-A9 MPCore with symmetric multiprocessing.

Figure 2:
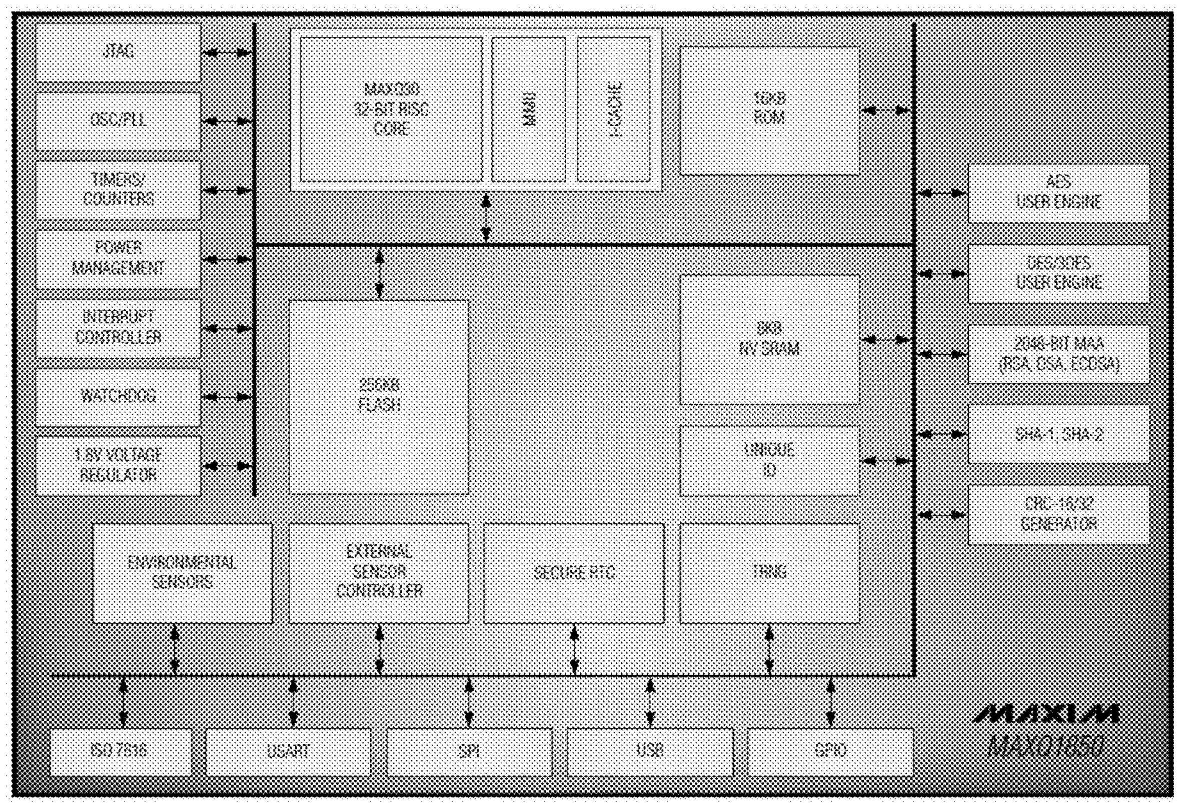
FIG. 2 shows the functional Block diagram of the Security Box (SB).

The Secure Controller (SC) of the MPCB is provided preferably by a Maxim chip, the Secure Microcontroller MAXQ1850 (FIG. 2). One functionality of the SC is a first level boot operation and the secure storage of cryptographic keys (NV SRAM).

The security features used by the Secure Controller are

Implementation of Secure Boot

Secure Key Storage (NV SRAM)

Hardware AES and RSA engine

SHA-256 engine

Real time Clock

In order to implement a Secure Boot sequence, the SC has to verify the integrity of the xloader and the u-boot of the MC, which is located in the NAND 2. The NAND 2 flash memory is accessed via an I2C IO-Expander. After verification of these boot components, the SC will start the MC by sending PWR_ON signal to the Power Management Unit.

In the following different Security Measures which shall prevent multiple attacks from different directions like from the Top, Bottom or Side of the terminal are discussed.

The attacker tries to get access to different locations of interest of the MPCB. At least he will get access to the secret authentication key and certificate in order to manipulate parts of the terminal software or he will steel PAN-data.

The terminal housing incorporates three main blocks, Top-Shell (A), Middle-Shell (B) and Bottom-Shell (C) with an optional Printer-Shell. The construction of the terminal bonds A and B in a way that it is impossible to remove part B from part A without interfering with essential functions of the device or without leaving a trace on the top and middle shell of the device. Both parts build in conjunction with active tamper switches the secure zone of the device.

LCD controller and Touch Sensor are in a possible embodiment glued. All secure relevant components of the MPCB (microprocessor, flash memory, USB controller, etc.) are mounted on top between the display and the PCB itself. The components orientation is relatively to the middle of the MPCB in order to prevent a side attack. The disassembly is protected by disassembly switches which are electrically separated from the main PCB. They are connected directly to the security box by a cable. The disassembly switch is an active component which communicates cryptographically with the security box.

The backside of the MPCB offers no attack potential because security relevant conductive path is layout to the inner layers of the MPCB; Interlayer connections to the backside are avoided. Side attacks need special tooling and expert know how of the processor board.

The area of the Magnetic Head is protected by a card reader rail made of spring steel which gives additional EMI/EMC protection. The Magnetic Head itself is an encryption head from MagTek.

The Disassembly switches are used in order to prevent the disassembly of the construction. The switches are components which build the secure zone of the device. Two switches will be directly soldered on the MPCB, one soldered on the SB. The switch has an active component which communicates with the SB over a single wire connection which implements a cryptographic protocol. It uses a SHA-256 hash algorithm to provide a very high level of security. The large key length of 256-bits prevents exhaustive attacks while multiple physical security features prevent unauthorized disclosure of the secret key stored within the device. The key is automatically erased when the power is removed from the encrypted tamper sensor. The device contains a unique 48-bit serial number that is used in combination with an input challenge and the stored secret key to generate a response that is unique for every individual encrypted tamper sensor.

All three switches are independent from each other. The switch is designed to be mounted on the main board and soldered manually.

The multilayered design of the MPCB together with the packaging of critical parts like memory and μC gives protection against drilling attacks from the backside.

The Touch Sensor cable is connected with the SB by a ZIF connector. In order to avoid removal attacks to the connector, the ZIF connector is located inside the Secure Zone and fastened by a squeezed PCB-Frame (D). The round part is a Disassembly Switch.

The Touch Sensor is based on protected capacitive touch (PCAP) which is sensitive to finger touches. The PCAP is also highly sensitive to conductive materials on the surface.

To make an overlay of either another PCAP or resistive touch it will at least contain something like an Indium Tin Oxide (ITO) layer which is conductive. This second conductive layer will interfere significantly with the normal operation of the touch screen.

Besides this the Terminal Touch area is a smooth glass surface that will make any overlay easy to detect and there is no space to hide a pin disclosing bug without it being visible.

The PCI SB Firmware (FIG. 3) consists of the Operating System, Tamper Control, Device Drivers for the Touch Screen, Chip Card Reader Interface and USB Host Controller Interface. It implements functions for Key Management, PIN Encryption, PAN Encryption, Chip Card Handling and Mutual Authentication between SB/MPCB. The PCI SB Firmware is downloadable using encryption and integrity checks and will be approved according PCI PTS 3.1, responsible is the SB Vendor. The USB Composite Device implements a HID device interface for touch events and a COM USB interface for functional level (Key Management, Crypto, PIN, etc.).

The Magnetic Stripe Reader (MSR) firmware consists of functions for Key Management and Data Encryption. The encryption is cryptographically bound between the SB and the MSR.

The software includes a secure boot, Kernel Modules and the Android OS. Application packages are provided by the Acquirer; they include e.g. Payment Apps. The FIG. 4 outlines the software components of the Android stack.

The Android platform is a customized and hardened Android or other Operating System.

Security relevant software components operated on the MPCB are considered as Firmware in PCI terms.

The PCI Terminal Firmware consists of Kernel components, Libraries and Android Runtime. These components will be checked during boot and at least once a day.

It is possible to update Add-On Applications and PCI Firmware. This includes the possibility to update a single file as part of an Application Package or a Device Driver as part of the System Package. It is also possible to update firmware files for the Security Box and NFC Reader. Download and verification of files is controlled by the Terminal Management Agent which is part of the System Package. Files belonging to the Application Package are signed under the responsibility of the Acquirer; files belonging to the System Package are signed under the responsibility of the Terminal Vendor.

During boot sequence (FIG. 5-7) the System Package will be checked for integrity.

The Device Manager distributes all relevant information about the Terminal configuration including parameters, configuration files for payment (BIN tables, AID tables) and binary files. Binary files means APK files with signed application files and updates of system (it means new images of system partition). Terminal management protocol will be based on secured SSL communication with Client and Server based certificates.

The update of Applications is provided by the Package Manager of the Android Software.

The Package Manager will install new or updated APK file which are delivered by the Terminal management system. The Package Manager has to control the APK files in order to avoid re-loading of old packages which can contain security weaknesses. The Application update processes comprises of the following steps:

Download new version of applications (APK files) to data storage

Install new versions of APK files via Package Manager

Package Manager will check signature of APK files and installs files to target application repository. Standard Android key store is used for verification of signature.

Application Package signature is checked every time application process is Created.

An update of the entire system image is also possible. It is done via the same application.

Figure 5:
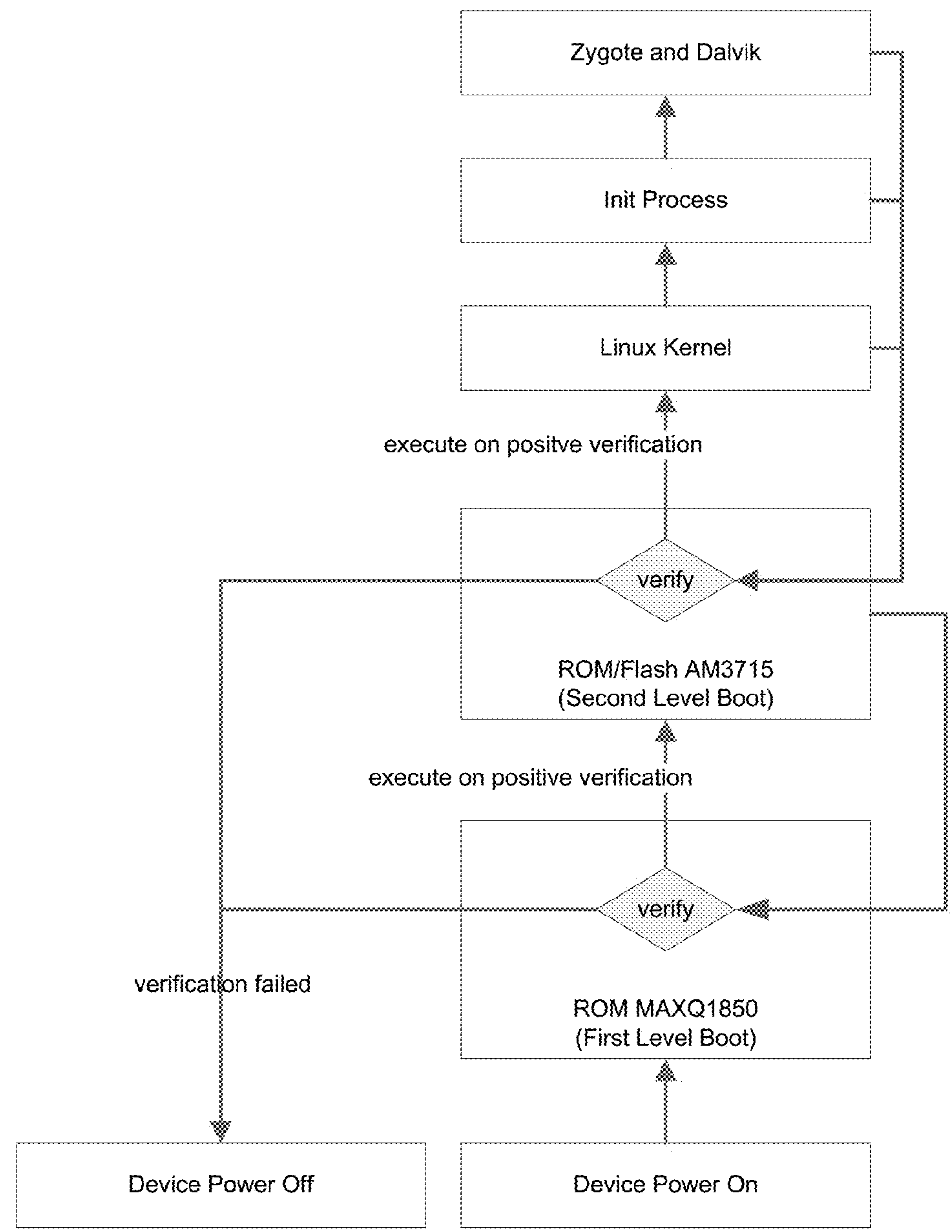
FIG. 5 shows the high level boot process.
Figure 6:
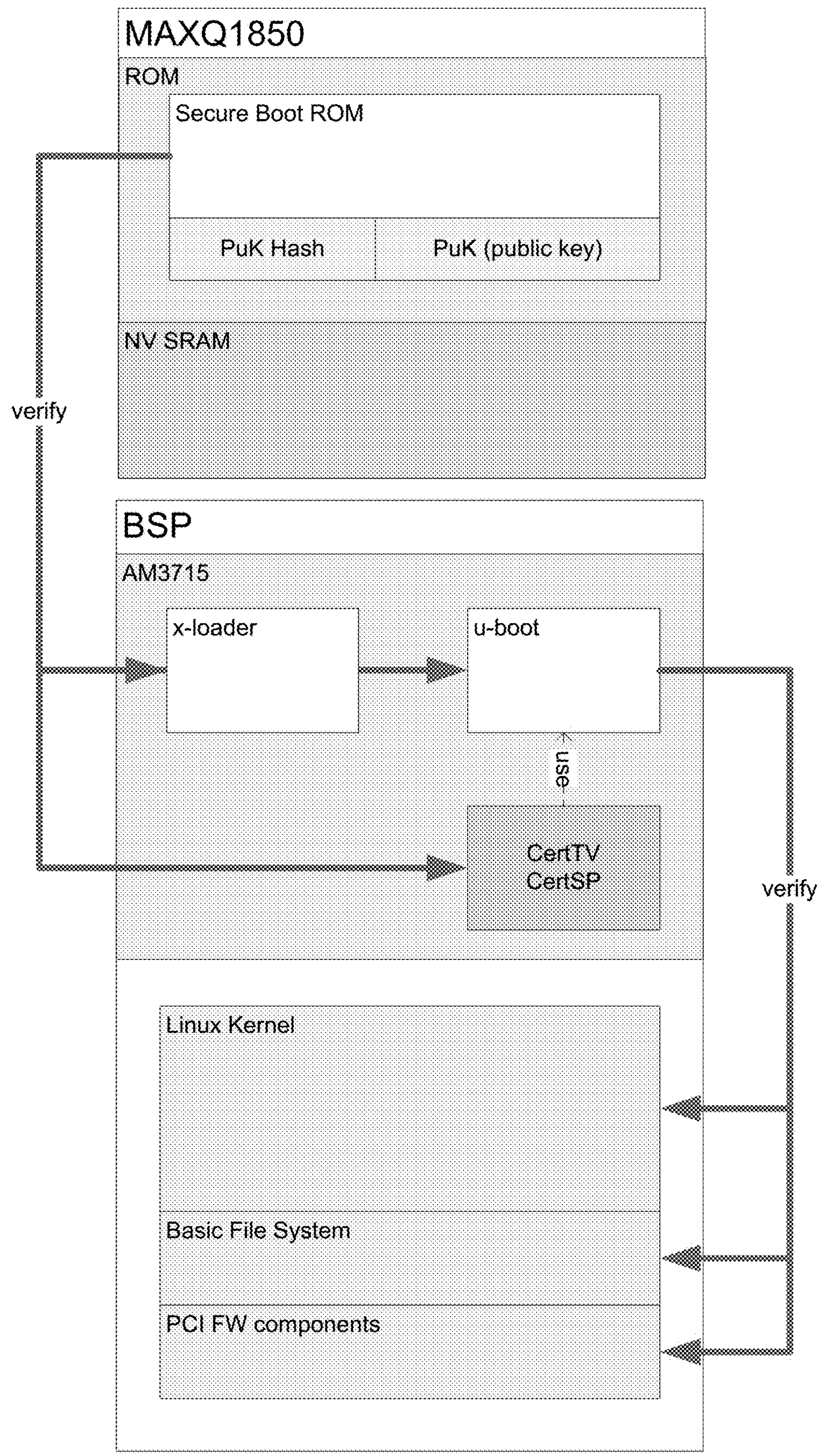
FIG. 6 shows the application flow of the integrity checks.

One of the critical points during the lifetime of a secure system is at boot time (FIG. 5,6). Many Attackers attempt to break the software while the device is powered down; performing an attack that, for example, replaces the secure world software image in flash with one that has been tampered with. If a system boots an image from flash, without first checking that it is authentic, the system is vulnerable. One of the principles applied here is the generation of a chain of trust for all terminal software established from a root of trust that cannot easily be tampered with.

The boot process is divided into several parts; first level which is executed is a "Secure Boot" stopping the boot process if a measurement fails (checking of signature). The second level boot is booting the main processor MC and continuing measurement of the entire System Package, stopping the process if the measurement fails. The FIG. 5 draws the principle of the terminals boot sequence.

When the device is powered on, the SC takes the control, the MC is still switched off. The SC boots from its pre-boot loader based in the internal ROM and executes customized ROM code which verifies the x-loader, u-boot and certificates necessary for booting the Android system. These components are located in the NAND2 flash memory. If these components are checked positive, the SC releases the MC by switching the PWR_ON signal. For verification purposes a public key (PuK) and a checksum of the components to be verified is stored in the NV SRAM of the SC; the key is issued by the terminal vendor and loaded in a secure manufacture environment. Customization of the first level boot is impossible, the device always boots from its internal customized ROM code. The code is loaded during device manufacturing in a secure environment of the Terminal Vendor.

The u-boot performs CPU dependent and board dependent initialization and configuration not done in the x-loader. The u-boot also includes an integrity check routine which verifies the System Package. After initialization of the global device list and enabling the interrupts, u-boot loads and starts the Kernel. At this time the Kernel assumes the responsibility and operates checked and verified software components.

The following components of the MC are verified during the first level boot of the SC:

Bootstrapping (x-load.bin.ift)

Boot loader (u-boot.bin)

Certificates

SRAM content

The following components are verified during the second level boot.

Kernel Image (uImage)

Basic Filesystem (rootfs)

PCI Firmware (PCI PTS relevant SW components)

The following Processor signals [7] are relevant for boot configuration and need modifications in order to hard wire the boot location to NAND 2.

This First Level Booter of the SC is customized ROM code which is executed when the device is powered on. It verifies following components which are located in the NAND 2 flash memory.

Root Certificate CertTV

BSP Certificate CertSI

Public device key MSPKauth

NV SRAM content

Binary of x-loader

Binary of u-boot

After successful execution and verification it releases the PWR_ON signal of the Power Management Unit TPS65920. This starts the execution of the MC internal ROM code and forces the loading of the x-loader code which starts the second boot level.

The x-loader is determined by a set of GPIO configuration which can not be changed. It is always located on a fixed address in the NAND 2 flash and it doesn't contain any security measures. The x-loader is responsible for some configuration and loading of the u-boot loader into the internal memory.

The u-boot is derived from the MPCB vendor's u-boot loader and enhanced for verification of the System Package. For verification of the integrity checksums a Vendor Certificate (CertSI) is used. The u-boot verifies the entire System Package.

The Authenticator is a program which is started by the init-process of the Android OS. It has the responsibility to implement a security protocol for mutual authentication with the SB and uses a Crypto API in order to access Key material and crypto functions of the SC.

The security protocol is based on T-DES using a Base Key generated by the SB (Kbk).

Another task is the verification of the System Packages for example every 24 hours.

The Crypto Manager implements the Crypto API which uses the underlying Security Architecture of the SC and provides low level cryptographic functionality to the Payment Provider and Secure HID Driver. For integration of the touch screen the platform provides a USB-HID driver which links the touch controller of the SB to the Android system. The signals are translated by this Kernel Input Device Driver and submitted to the Android EventHub component. The Android InputReader component then decodes the input events according to the device class (HID) and produces a stream of Android input events. As part of this process, the Linux input protocol event codes are translated into Android event codes according to the input device configuration, e.g. various mapping tables. At the end the input reader sends the events to the input dispatcher and hence to the top application window. The HID driver in a possible embodiment doesn't implement en-/decryption. During PIN entry no touch events are submitted. So far this behavior is standard Android behavior and has no impact to the Add-On Application development. One restriction exists; the platform verifies the integrity of security relevant software components. If the verification is positive, the platform sends a notification to the SB embedded into a mutual authentication protocol. This notification will force the SB to release the submission of touch events to the MPCB. If the authentication or the integrity checks failed, no events will be submitted and the device will be powered down.

The SB Crypto Driver provides the low level USB interface to the SB. It implements active cryptography analogue to the Secure HID Driver and communicates with the SB. It provides low level functions to the Payment provider.

The Payment provider is a set of components which provides a common interface for all applications which need payment functionality or security functionality. The following describes the high level functionality of the Payment Provider.

It provides interface relevant to EMV (Europay, MasterCard and Visa) transaction processing. This interface serves a common high level building block for payment application which covers the following.

Application selection (reading EMV applications, process candidate list regarding to configured applications in AID configuration table.

Offline processing—processes reading of records from ICC card, checking necessary data. It process also SDA, DDA, CDA authentication and CVM processing (handling of offline or online PIN entry) and terminal risk management steps.

1st Cryptogram—processing of 1st cryptogram task regarding to results gathered by Offline processing 2nd Cryptogram—in case of transaction which are done in Online mode $2^{nd}$ cryptogram generates final cryptogram calculation after (successful or unsuccessful) online communication, it handles processing of critical and uncritical EMV script.

The whole transaction processing is responsibility of payment application. Handling of offline/online transaction process and printing have to be processed by Payment application.

EMV Contact Less interface (PayPass, PayWave) provides the interface for contactless cards processing. Contactless cards are processed regarding to rules defined in EMV Book A and B using the PayPass or PayWave kernels. It means that there are processed all steps which are mandatory for successful transaction.

Read record processing

Generation of cryptogram

Processing of CVM list or CTQ and TTQ indicators

The whole transaction processing is responsibility of payment application. The CVM processing, printing and handling of offline/online transaction process have to be processed by the Payment application.

The Card reader interface Provides interface for relevant card reading functions which depends on used card media types.

For magnetic stripe card it provides information about read data (Track 1, Track 2, Track 3) and detection of swiped card.

For ICC interface it provides possibility to detect insertion of card to card reading slot, to process EMV reset (include the handling of necessary data) and low level interface (on APDU base) which can be used for non EMV cards or for handling any special local enhancements of standard EMV cards.

Contact less cards can be detected via this interface; interface provides additionally information about detected card (payment cards are then processed by EMV Contact Less interface). For non standard or private contact less cards can be used direct pass-through interface which uses low level data protocol.

The Secure Storage Interface is used to store secure relevant Payment data in rest, e.g. for storing offline transactions or store and forward queues. For the data storing the standard flash internal memory of main PCB board (data partition) is used, but all data are encrypted by two level of keys.

The Security Interface provides an interface for standard security functions used during transaction processing or during communication with the payment backend system.

MAC interface interface for calculating MAC codes of messages

Key Loading Interface

Encryption interface

For Key Management (KMS) purpose the Terminal provides DUKPT [14] and CBA [4] specific functions in order to adapt the Payment Application to KMS.

The PIN Interface is used for PIN handling functions and PIN block encryption functions. It is used during offline PIN handling process (clear text PIN processing, enciphered offline PIN processing) and Online PIN processing.

Offline clear text PIN process (used by EMV transaction interface)

Offline enciphered PIN process (used by EMV transaction interface)

Online enciphered PIN process (used by common transaction processing parts and EMV transaction interface), it is divided to two parts PIN entry process and PIN block calculation and retrieving task.

The Payment App (Application) is built on top of standard Android interfaces and on custom Payment provider interfaces. The Payment application implements all necessary steps for processing successful payment transaction requested by the customer (acquirer). Main responsibilities are the following.

Process input of all necessary data for transaction (merchant inputs)

Process of card reading and card processing tasks (there is used Payment provider)

Process transaction accordingly to transaction flow requested by card scheme or card media type (ICC, contact less, mag. Stipe).

These steps includes PIN entry processing, EMV or Contact Less processing, risk management processing Application is responsible for communication with host and for implementation of host protocol interface.

Application is responsible for implementation of ECR protocols used for integration with Cash registers.

An application collects data about transactions and prepares data for Close of the day process (in case of dual-message systems uses store and forward queues protected by Security interface of Payment provider).

In addition to the Payment App a set of Value added applications can be installed on the device. The prompt control of these Apps is under the responsibility of the Terminal Acquirer. These Apps deliver additional functionality and more convenience to the merchant like Dynamic Currency Conversion (DCC)

Point Of Sale/Electronic Cash Register integration capability

Simple Split Bill etc.

This application allows the capture of cash and cheque purchases and provides the merchant information about all purchases from a terminal, including the card, cash and cheque purchases.

The Security Concept allows also the services provided by Google Wallet. The device acts as a NFC reader device which will be approved with the Mastercard PayPass payment method.

The Terminal will be equipped with a central logging service. The log-information is written to a file which can be transferred to the Terminal Management System. There are several Security Controls which can be reported by means of the Terminal Management Agent; further information is in "Security Controls" in Section "Terminal Life Cycle".

The TMS Agent is responsible to manage a Terminal installed in the network. It delivers information about the actual HW and SW status of the terminal and is further responsible for downloading Add-On Applications and PCI Firmware. It interacts with the central TMS System. In principle the TMS Agent provides the Terminal Data to a Device Manager which is operated by the Sponsor. The Device Manager Downloads the Terminal Settings to the Terminal. The TMS Agent collects security information which can be analyzed by e.g. the Device Manager. The exact information and structures will be specified in a separate document. The following information is intended to provide but is not limited to this list.

After Power On (FIG. 7), the default modus of the SB is the Secure Mode, which prevents the SB from submitting touch events. After Secure Boot with successful verification of the System Package, the Terminal processes a mutual authentication with the SB, the Authenticator is responsible. After successful authentication the SB is transferred into Clear Text Mode which allows the submission of touch events.

The Process which is responsible for mutual authentication is started by the init-program of the Android System. The mutual authentication is based on the Pkauth and Skauth and the Terminal Vendor Certificate.

The Clear Text Mode is terminated when the terminal is powered off or a defined time frame is exhausted (24 h); the time frame is controlled by the Terminal Management Agent. For PIN entry the SB is transferred into the Secure PIN Mode, no PIN codes or touch events are transmitted via the HID class except replacement coordinates. A Payment Application which starts the Secure PIN Mode needs to authenticate with the SB using a cryptographic key which is generated by the SB and transferred to the payment application during registration. Registration is the process when the HID device driver and the generic USB device driver register to the security box. The Secure PIN Mode is terminated when a function key (Cancel, Clear) is pressed, or the maximum PIN characters are entered by the cardholder. The following state diagram outlines the different modes.

The Android mobile platform was designed to be open to all kind of applications development which makes use of advanced hardware and software. The applications executed on the Terminal Platform must rely on this architecture provided; additionally specific platform hardening will be applied and described in the chapter Android Hardening. The Android Platform Security Architecture consists of the following key security features.

Linux Kernel which shall provide robust security to the OS

Application Sandboxing

Secure interprocess communication

Application-defined and user-granted permissions

A general description of the Android Security Platform is provided on the developer's page http://source.android.com/tech/security/index.html The following components interact with the security boundary of the Terminal.

For the device a switchable Privacy Filter is used. The switchable filter is operated in combination of a random shifted soft PIN Pad displayed on the screen. The LCD panel will be covered by a transparent foil. Lenses integrated in the foil focus the light of selected sub pixels in a limited solid protection angle in compliance with the requirements for attended devices [2]. The outside of this solid angle information from these sub pixels is not visible.

In normal mode all pixels of the LCD panel are active. The information will be visible from all sides. In pin entry mode only the selected sub pixels with lenses will be used to show the virtual PIN Pad on the screen. Only the user who enters the PIN and looks perpendicular to the screen can see the virtual PIN Pad. It is possible that a small part of the screen is in normal mode and another part is in PIN entry mode at the same time. For technical reasons the PIN Pad can be shown monochrome only. Resolution and brightness of the screen in PIN entry mode is limited because only a subset of pixels will be used.

The size and position of the PIN Pad on the screen is flexible and will randomly vary with every transaction. Without the information from the screen it will be impossible to spy out the PIN with detection of the finger position on the touch screen. It is recommended to show only the numeric keys in Pin entry mode and the function keys at a fixed position on the screen in normal mode.

The combination of the camera optics (viewing angle) and the placement of the camera prevent from spying finger positions during PIN entry mode.

Sensor Events are submitted from the kernel driver to the Dalvik and are presented in the class Sensor Event. All values are in radians/second and measure the rate of rotation around the device's local X, Y and Z axis. This might be used from a software based PIN disclosing bug which displays a virtual PIN pad on the screen by measuring the rate of rotation during PIN entry instead of receiving touch events. The following measures prevent against installation of a software based PIN disclosing Bug.

The Terminal executes only acquirer signed applications. These Apps are qualified, signed and under control of the acquirer. Installation of unknown Apps is prevented by the integrity measurement system of the Terminal during its Boot Sequence. A hardware based attack is out of scope.

The following Communication Devices can be included in the Hardening Concept.

PCIE 3G Module

Ethernet IF Module

WiFi, BlueTooth, GPS

The vendor of the terminal is responsible for System Package Signing and embeds a certificate CertSI in the Boot Loader for verification. The Boot Loader itself is verified by using a different public key which is embedded in the NV SRAM of the SB controller.

The Android system requires that all installed applications be digitally signed with a certificate whose private key is held by the issuer of the application.

The Android system uses the certificate as a means of identifying the author of an application and establishing trust relationships between applications. The certificate is used to control which applications the issuer can install. The techniques that are used according Key Life Cycle and related services are in compliance of ISO 11568-2 and ANSI X9.24. For device key management symmetric and asymmetric cryptography for different purpose is applied. The minimum key sizes and parameters for the algorithms provided by the terminal follow the PCI requirements.

LIST OF REFERENCE NUMERALS

[1] PIN Transaction Security Point of Interaction, Ver. 3.1 Oct. 2011 PCI Modular Security Requirements

[2] PIN Transaction Security Point of Interaction, Ver. 3.1 Oct. 2011 PCI Modular Derived Test Requirements

[3] Encrypting USB Intellihead, Technical Reference Manual, 99875370-2 MagTek April 2009

[4] CBA EFTPOS Specification, Ver. 1.5 Aug. 2006 Commonwealth Bank of Australia

[7] OMAP4460 Multimedia Device Silicon Revision 1.0 Q, Texas Instruments

[8] Maxim MAXQ1850 Data sheet.

[9] H26M52002CKR eMMC Memory HYNIX data sheet

[14] ANSI X9.24-1, Retail Financial Services Symmetric Key Management

The invention claimed is:

1. A User-terminal for entering secure user information, comprising: a processor configured for running an operating system with applications; a touch screen configured for displaying information and receiving user inputs as touch coordinates from a user; a Security-Box being connected between the touch screen and the processor and configured to control a transfer of the user inputs to the processor, the Security-Box being configured to run in a "Secure Mode" and a "Clear Text Mode," wherein when running in "Secure Mode" the user inputs are forwarded as replacement coordinates of the touch coordinates entered by the user, forwarded to the processor, and when running in "Clear Text Mode" the touch coordinates are transmitted to the processor; wherein the user-terminal is configured to run at least first and second applications displaying information on the touch screen and allowing an interaction with the user, the first application interacting with the Security-Box to perform security relevant financial transactions; wherein the second application interacting in "Clear Text Mode" with the touch screen; wherein the first application interacting with the Security-Box is configured for switching the Security-Box into "Secure Mode" and needs to be authenticated with the Security-Box using a cryptographic method with one or more security keys; and wherein the touch screen is connected to the Security-Box and the Security-Box is connected to the processor via a USB Composite Device having two logical USB-Channels, and wherein the two logical USB-Channels are setup to transmit the touch coordinates and the replacement coordinates respectively.

2. The User-Terminal of claim 1 wherein the security keys are stored in the Security-Box.

3. The User-Terminal of claim 1 wherein the first application interacting with the Security-Box uses a signature or cryptogram to authenticate with the Security-Box.

4. The User-Terminal of claim 3 wherein the Security-Box is configured to verify the signature or cryptogram of the first application interacting with the Security-Box before allowing switching into "Secure Mode".

5. The User-Terminal of claim 1, wherein the User-Terminal is a mobile device without any physical keyboard and allowing interaction via the touch screen.

6. The User-Terminal of claim 1, wherein the User-Terminal is a Point-of-sale (POS) terminal for entering a personal identification number (PIN) to enable a financial transaction, and further comprising: a card reader for reading information from a credit card.

7. The User-Terminal of claim 6, wherein the card reader is a chip card reader that is integrated into the Security-Box, and wherein the Security-Box is configured to process a financial transaction based on the PIN and information of the credit card, without using the processor or applications running on the processor.

8. The User-Terminal of claim 6, wherein when a virtual pin-pad is displayed on the touch screen, the Security-Box switches to a "PIN-Entry-Mode" and is configured to interpret a user touch as the PIN, and to encrypt the PIN to forward the information together with credit card information to an associate service center/bank over a network controller.

9. The User-Terminal of claim 1, wherein the first application is further defined as a payment application running on the operating system and switching the Security-Box into "Secure Mode" and directing the touch screen to display a virtual PIN-pad on the display, wherein the payment application forwards card information from a card reader to the Security-Box, wherein the payment application forwards an encrypted personal identification number (PIN) received, from the Security-Box, to a service center/bank.

10. The User-Terminal of claim 9, wherein the payment application is configured to shift the virtual pin-pad randomly on the touch screen for every transaction and wherein the Security-Box is informed about the coordinates of the PIN Pad, to be able to interpret the user inputs.

11. The User-Terminal of claim 1, wherein the Security-Box and the display are connected with each other, and sensors indicate when a disconnection is performed, which leads to a deletion of keys in the Security-Box.

12. The User-Terminal of claim 1 wherein the touch coordinates and other touch events are transmitted with a first of the two logical USB-Channels and the replacement coordinates are transmitted with a second of the two logical USB-Channels, and wherein Key Management commands are also transmitted only over the second of the two logical USB-Channels.

13. The User-Terminal of claim 10 wherein a size of the virtual pin-pad is changed with every PIN entry.

* * * * *